Dec. 1, 1964    W. R. BENNETT, JR., ETAL    3,159,707
GAS OPTICAL MASER
Filed June 15, 1962      2 Sheets-Sheet 1
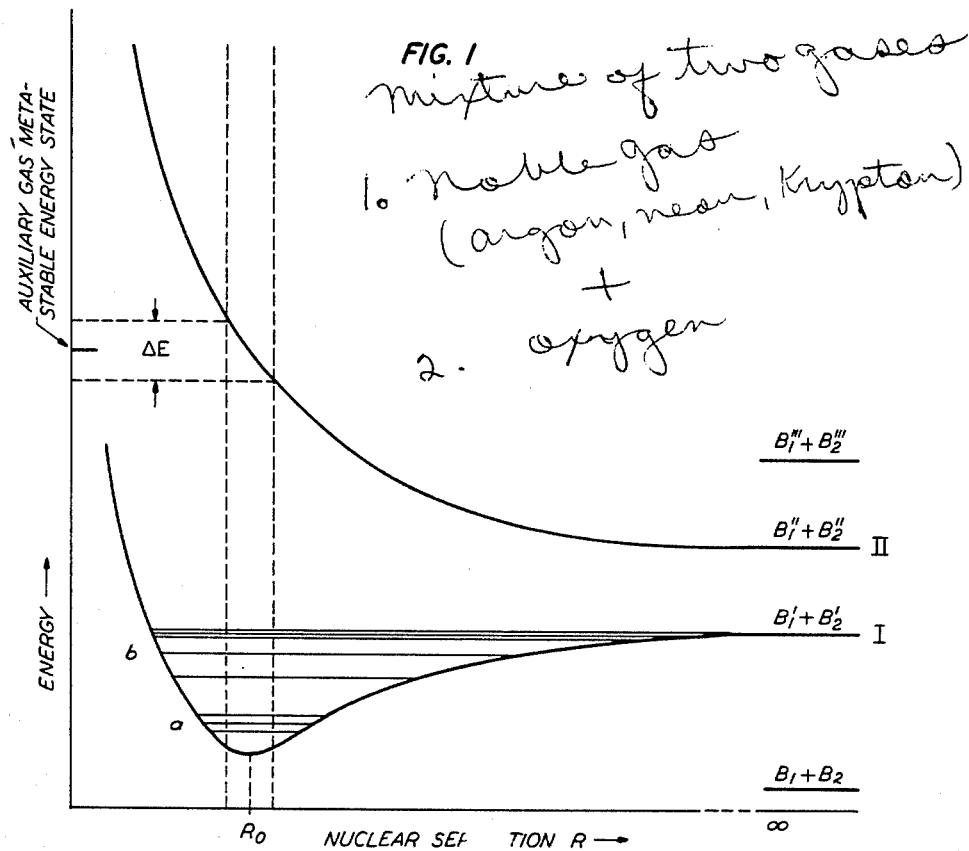
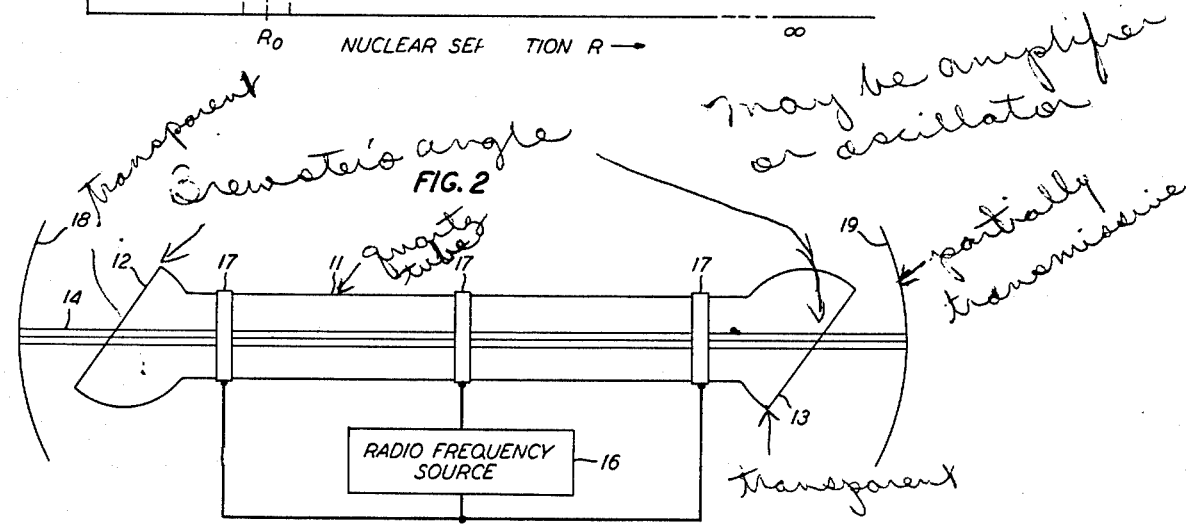
INVENTORS W. R. BENNETT, JR.
A. JAVAN
BY
*David P. Kelley*
ATTORNEY 3,159,707
GAS OPTICAL MASER
William R. Bennett, Jr., Berkeley Heights, N.J., and Ali Javan, Cambridge, Mass., assignors to Bell Telephone Laboratories, Incorporated, New York, N.Y., a corporation of New York
Filed June 15, 1962, Ser. No. 202,872
14 Claims. (Cl. 88—1)

This invention relates to optical masers and, more particularly, to optical masers employing gaseous active media.

The recent development of coherent light amplifiers and oscillators, now generally referred to as "optical masers" or "lasers" has made feasible a host of new uses and applications of electromagnetic wave energy in the optical portion of the spectrum. Light waves produced by such devices can be very sharply focused to produce energy densities suitable for welding, cutting, drilling and similar purposes. Furthermore, the high degree of monochromaticity obtainable from an optical maser makes it a useful tool for spectroscopic investigations as well as for stimulating various types of chemical and physical reactions. Among the most promising applications of coherent light are those in the field of communications where the optical spectrum represents virtually unlimited bandwidth and information carrying capacity. In addition, the directionality of optical maser beams greatly mitigates many problems of interference and security of communications channels.

For communications and other applications it is advantageous to have optical masers operable at many different wavelengths in the light spectrum, which is deemed to include infrared, visible and ultraviolet energy. As the wavelength emitted by any particular energy transition in a laser medium is tunable only over a small portion of the spectrum, it is important to provide a number of materials adapted for use as active laser media at various light frequencies. A great amount of research has recently been directed to the discovery of such materials and a number, particularly in the solid state, have been found. Furthermore, especially for communications use, it is important that laser media be provided which are adapted to continuous wave operation. In general, such media are those characterized by three or more energy levels, at least two of which are optically connected. A further communications requirement is low noise, a feature which, due to the complex structure and emission characteristics of solids, appears more readily achievable with gaseous optical masers.

In order for a material to be useful as a negative temperature medium in an optical maser, it is essential that it be "pumpable," i.e., that there be some way of increasing the population of the upper level of an optically connected pair of levels, designated the signal transition, to the point where it equals or exceeds the population of the lower level of the pair. Coherent emission is then obtained by stimulating the return of the population to an equilibrium distribution. In one type of laser the inverted population condition is produced by optical pumping with light of a higher frequency than that of the signal transition. Other high frequency pumping schemes are also known. Unfortunately, many are relatively limited in their efficiency because of the requirement that the pump energy fall within a certain frequency range. Ordinary sources of light energy, however, have outputs which normally extend over a much broader spectral range. Much light produced by such a source, therefore, may be useless for pumping a particular medium.

Another pumping technique which has proven useful in the case of certain gaseous laser media is electron bombardment. Optical maser action has been produced by this means in the noble gases helium, neon, argon, krypton and xenon. In a typical noble gas laser, the noble gas atoms are excited by collisions with free electrons in a gaseous discharge. In order for a population inversion to result from electron-atom collisions, it is essential that the active gas have a heavily populated energy state with a large cross section for excitation to the upper level of the signal transition or to a higher level which relaxes or decays thereto. It is also necessary that various competing effects produced by the interaction of electrons with the gas be maintained at a relatively low level. Thus, pumping of gas lasers by electron-atom collisions requires careful selection of the active gas as well as precise control of environment factors such as pressure and intensity of the discharge. In many cases, moreover, special measures must be taken to inhibit interactions which compete with the desired one.

The selectivity of excitation in a gaseous discharge may be enhanced by mixing the active gas with an auxiliary gas which has a metastable energy state matching the upper maser level. The auxiliary gas is then excited to its metastable state and, through resonant interaction in inelastic atom-atom collisions, the excitation is transferred to the active gas. This process, disclosed in copending application, Serial No. 277,651, filed May 2, 1963, which is assigned to the assignee hereof and is a continuation in part of Serial No. 816,276, filed May 27, 1959, by Ali Javan, and now abandoned, made possible the first continuous wave optical maser. In a variation of the technique, the auxiliary gas serves to populate a metastable state of the active gas which has a large cross section for excitation to a desired upper level. Although it is applicable to all combinations of gases which satisfy the particular energy level criteria, the atom-atom collision process is limited by the close coincidence required of the energy levels between which the excitation transfer occurs. It appears that the number of such coincidences which exist in nature is insufficient to cover all parts of the light spectrum as is desired.

An object of this invention is the generation and amplification of coherent wave energy in the optical portion of the electromagnetic spectrum.

Another object of this invention is to facilitate the generation and amplification of coherent light by means of optical masers employing gaseous active media.

It is also an object of this invention to provide gaseous optical maser media which are excited by processes which include inelastic collison transfer from particles of one gas to particles of another.

These and other objects of the invention are achieved in a specific illustrative embodiment thereof comprising means forming an enclosed space for containing a gaseous optical maser medium, and means defining a light beam path through the enclosed space. Means are also provided for pumping the gaseous medium in the manner herein disclosed.

It is a feature of the invention that the gaseous active medium comprises a mixture of an active molecular gas and an auxiliary gas.

A further feature of the invention is an active gas having a polyatomic molecule characterized by at least one repulsive excited energy state. The repulsive molecular state or states advantageously terminate in an upper energy level of a component atom or atoms of the molecule.

It is also a feature of the invention that the auxiliary gas has a metastable energy state substantially matching a repulsive state of the molecule of the active gas. In accordance with the invention, the auxiliary gas is excited to its metastable state from which energy is transferred by inelastic collisions to repulsive states of molecules of the active gas. Through dissociation of the molecules, the excitation is finally transferred to an upper energy level of a component atom or atoms. The atomic energy level whose population is increased in this manner may be the upper level of an optically connected pair, or a higher level which relaxes to the upper signal level, or a lower level having a large cross section for excitation to the upper signal level.

The above mentioned as well as other objects and features of the invention will be fully understood from the following more detailed discussion, in which:

FIG. 1 is a plot of energy versus nuclear separation in an exemplary diatomic molecule, used in explaining the invention;

FIG. 2 depicts an optical maser illustrative of the invention; and

Figure 3:
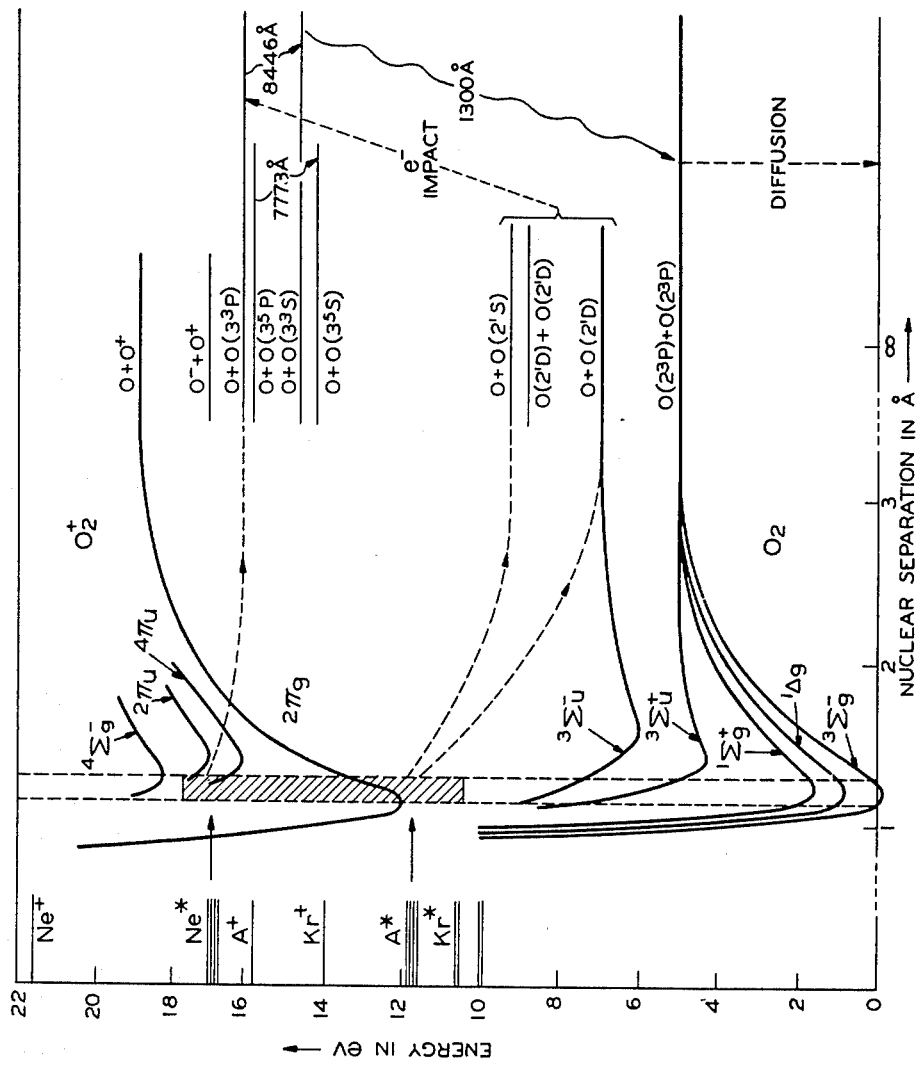
FIG. 3 is a plot of energy versus nuclear separation in the oxygen molecule, and further illustrates the relation between oxygen energy levels and those of three noble gases.

Turning now to FIG. 1, there is shown a plot of the energy of various electronic energy states as a function of nuclear separation. For purposes of this explanation, the molecule is assumed to be diatomic, consisting of atoms $B_1+B_2$. A complete description of the quantum states of even a diatomic molecule is quite complicated and will not be given herein. Instead, advantage will be taken of the simplifications introduced by assuming that nuclear separation can be varied over a considerable range without causing transistions in electronic energy states.

For any nuclear separation R there is a set of electronic energy levels, two of which are shown in FIG. 1. In the limit of infinite R, the sum of the energies of these levels becomes the sum of the energies of two definite energy states either of the atoms $B_1+B_2$ or of the ions $B_1^+$ and $B_2^-$ or $B_1^-$ and $B_2^+$. It is important to note, however, that a plurality of molecular electronic energy levels may tend to the same limit. Thus, while the ground molecular electronic level, for example, will terminate in the ground state of the atoms, this may be true of other molecular levels as well.

The curve I in FIG. 1 has a minimum at $R=R_0$ which is therefore an equilibrium separation of the nuclei. As R tends to infinity the curve tends asymptotically to a level representing the sum of the energies of the states $B_1'$ and $B_2'$ of atoms $B_1$ and $B_2$. Below this level there is a discrete series of quantum states of nuclear motion such as $a$ and $b$, converging to a limit at $B_1'+B_2'$. Above this limit is a continuum of unbound nuclear states representing the dissociated molecule.

The curve II of FIG. 1 represents a repulsive state of the molecule. As curve II has no minimum, there is a repulsive force between the atoms $B_1+B_2$ at all separations. There are no stationary nuclear states and no stable molecule can exist. The repulsive molecular state represented by curve II terminates, at infinite R, in a level corresponding to the sum of the energies of states $B_1''$ and $B_2''$ of atoms $B_1+B_2$. The region above curve II is similar in all respects to the continuum of electronic states that lies above $B_1'+B_2'$ in the case of the attractive states represented by curve I.

A transition between energy states in a molecule may result from an internal perturbation or from an external one such as a collision with another particle, or absorption or emission of radiation. In the case of an electron-molecule collision, for example, the Franck-Condon principle states that the transition occurs so quickly that the relative nuclear motions are virtually unaffected. The consequences of the transition thus depend to a large extent on the shapes of potential energy curves of the initial and final states. If the final state lies entirely within the region of the discrete electronic levels of the upper curve, the transition results in a stable excited molecule. On the other hand, if the final state lies within the region of the continuum of nuclear levels, the transition results in dissociation of the molecule into its component atoms. The energy states of the atoms then depends on the limit of the potential energy curve for infinite nuclear separation.

It has been found that the Franck-Condon principle is also approximately valid, for instance, in the case of atom-molecule collisions. Validity, to some extent at least, is also indicated in other cases, such as grazing collisions between molecules. The dashed vertical lines in FIG. 1 indicate a region in which the Franck-Condon principle indicates excitation from the ground state of the $B_1B_2$ molecule to be probable. The dashed horizontal lines indicate an energy range $\Delta E$ within which there is a substantial probability that energy will be transferred to the repulsive molecular state of curve II. Thus, in accordance with the invention, molecules of a gas having an energy system of the type illustrated in FIG. 1 may be caused to dissociate into excited states of their component atoms by inelastic collisions with particles of an auxiliary gas in a metastable state having an energy within $\Delta E$. The metastable state of the auxiliary gas is said to be matched to the repulsive excited state of the molecule which terminates in a particular level or levels of the component atoms.

Following the principles of the invention, the active medium of an optical maser comprises a mixture of an active gas and an auxiliary gas. The active gas has a polyatomic molecule which comprises at least one atom having a plurality of energy states, including an optically connected pair of states, above the ground state. The molecule has an energy system characterized by one or more repulsive excited states which terminate in upper energy states of the component atoms. Preferably, the repulsive molecular states terminates in the upper energy level of the signal transition, or in a lower lying metastable level having a relatively large cross section for excitation to the upper laser level, or in a higher level which relaxes or decays thereto.

The auxiliary gas of the invention is characterized by at least one metastable level above the ground state. The metastable level or levels are substantially matched to one or more of the preferred repulsive states of the active gas molecules. The auxiliary gas metastable state is easily populated, for example, by collisions with free electrons in a gas discharge. Although it may be somewhat indiscriminate in that auxiliary gas particles are excited to many states other than the desired metastable, such a technique is convenient since many of the higher states may decay to the metastable. Thus, a relatively large metastable population is easily maintained. Of course, other excitation techniques may also be used to achieve the desired result.

In optical masers of the type disclosed in the above-mentioned copending application of A. Javan, energy is transferred by collisions from a metastable state of an auxiliary gas directly to an excited atomic state of the active gas. The resonant transfer which occurs in inelastic "collisions of the second kind" requires a rather close correspondence between the metastable and the excited atomic state. In general, the discrepancy must be no more than a few $k$T. This requirement restricts the number of gaseous mixtures which may be used. In the present invention, however, the range $\Delta E$ represents a relatively large variation between the metastable and the repulsive molecular state. Thus, a great many more combinations are possible. The transfer of excitation from metastable states of an auxiliary gas to excited atomic energy states by way of molecular dissociation may be termed "quasi-resonant." The restriction imposed by the requirement for matching energy states is further reduced by the fact that in some molecular gases there are a plurality of repulsive states which terminate in favorable energy states of component atoms. In optical masers employing gaseous mixture as taught herein, efficient transfer may be possible over a range as large as several electron volts.

A coherent light generator or amplifier may comprise apparatus as illustrated in FIG. 2. There is shown an elongated quartz tube 11 defining an enclosed space for containing a gaseous active medium. A light beam path through the tube 11 is defined by transparent windows 12 and 13, which are inclined at Brewster's angle to the path of light beam 14. By placing the windows at Brewster's angle light polarized in the plane of incidence is enabled to be transmitted without reflection. Radio frequency energy, supplied by a source 16 is applied to the gaseous medium by means of electrodes 17 which, in the illustrated embodiment, are external to the tube 11. The use of external electrodes avoids contamination of the gas mixture as well as eliminating fouling of the windows 12 and 13 by sputtering.

If the device shown in FIG. 2 is to be used as a source or oscillator, a pair of reflectors 18 and 19 may be positioned adjacent the windows 12 and 13. The reflectors 18 and 19, which may be, for example, either flat or curved as taught in application Serial No. 61,205, filed October 7, 1960 by Boyd, Fox and Li and issued September 25, 1962 as United States Patent No. 3,055,257. In the drawing, the reflector 19 is partially transmissive to permit the coherent light to be abstracted from the optical cavity resonator for utilization as desired. The device may be used as a coherent light amplifier either with or without reflectors.

Portions of the energy level systems or molecular and atomic oxygen are depicted in FIG. 3, which also displays portions of the energy systems of neon, argon and krypton. Thus, FIG. 3 shows for a specific molecular gas the information given in simplified form in FIG. 1. All of the oxygen energy levels are defined with respect to the ground state oxygen molecule. With the exception of the level representing the dissociation of $O_2$ into the ions of $O^+$ and $O^-$, there are shown only the molecular dissociation limits involving one ground state oxygen atom. The solid curves represent the energy of various attractive energy states of the oxygen molecule, as a function of nuclear separation. The dashed curves represent neutral excited repulsive states of $O_2$. The existence of such states has been determined from observation of molecular absorption bands, many of which are unclassified, extending over the energy range roughly indicated by the shaded area between the dashed vertical lines. As in FIG. 1, the vertical lines indicate roughly the region over which the Franck-Condon principle has validity sufficient, at least for purposes of this invention. Although the existence of the repulsive molecular states has been determined, as has the fact of their termination in certain excited states of atomic oxygen, their energies have not been determined for all values of internuclear separation. It is to be understood, therefore, that the illustrated shapes of the dashed curves are only qualitative.

At the left-hand edge of FIG. 3 there are shown various energy levels of neon, argon and krypton. Four metastable levels ($^3P_2$, $^3P_1$, $^3P_0$ and $^1P_1$ in order of increasing energy) are denoted by asterisks. The metastables of these noble gases are at levels which substantially match certain preferred repulsive excited states of $O_2$. Thus they are well adapted to transfer energy, by resonant processes occurring during inelastic atom-molecule collisions, to such repulsive states and by molecular dissociation to preferred states of atomic oxygen.

In accordance with the invention, continuous wave optical maser action has been achieved on the $3^3P_2$–$3^3S_1$ transition of atomic oxygen at 8446 A. The upper maser level is populated by processes involving dissociative excitation as disclosed herein. Gaseous mixtures of Ne–$O_2$ and A–$O_2$ have been found particularly advantageous. The $3^3P$–$3^3S$ and $3^3S$–$2^3P$ transitions of atomic oxygen are strongly allowed and their radiative lifetimes have been found to be well suited to obtaining the population inversions required for maser operation. As is well known, however, electron excitation cross sections are roughly proportional to the electric dipole transition probabilities between a given pair of levels. Consequently, population inversions on the $3^3P$–$3^3S$ transitions cannot be maintained by electron impact with ground state oxygen atoms. Selective dissociation of molecular oxygen into excited states of atomic oxygen is, therefore, required.

In a Ne–$O_2$ gaseous mixture, the metastable level of neon is populated principally by collisions with free electrons in an electrical discharge. Excitation is then transferred directly to a repulsive state of $O_2$ which terminates in the desired $3^3P$ state of atomic oxygen. A more involved process prevails in the A–$O_2$ mixture in which excitation is transferred from argon metastables to repulsive states of $O_2$ which terminate in the $2^1D$ and $2^1S$ states of atomic oxygen. These excited states of oxygen are themselves metastable and, unlike the ground state of oxygen, have a large cross section for excitation to the $3^3P$ level.

Measurements made with an optical maser of the type shown in FIG. 2 in which the quartz tube had an inside diameter of 7 mm. indicated that the reaction

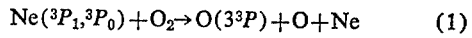

was a dominant source of atomic oxygen in the $3^3P$ state. Measurements of the 8446 A emission line in A–$O_2$ and Kr–$O_2$ mixtures showed that excitation came primarily from the two-step process

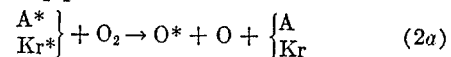

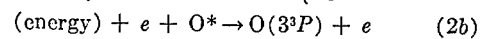

In all cases the asterisk indicates a metastable level. In the Ne–$O_2$ laser, optimum pressures were about 0.014 mm. Hg of $O_2$ and 0.35 mm. Hg of Ne. With A–$O_2$, optimum pressures were found to be 0.036 mm. Hg of $O_2$ and 1.3 mm. Hg of A. Output powers were about the same in each case, with an optical gain of about 3 percent per meter.

Recombination of oxygen atoms into molecules appears to take place primarily at the walls of the gas tube. In general, the output power of the Ne–$O_2$ and A–$O_2$ lasers varies inversely as the diameter of the tube. Thus, total power output may be increased by providing additional surfaces within the tube as taught in copending application Serial No. 186,886, filed April 12, 1962 by W. R. Bennett, Jr. and assigned to the assignee hereof.

Although the invention has been described with particular reference to specific embodiments, this is to be construed as illustrative only and not as a limitation. Many variations and modifications of the invention are possible and may be made by those skilled in the art to which it pertains without departing from its scope and spirit. Although the metastable $2^3S$ level of helium is considered too high for efficient transfer of energy to the oxygen molecule, helium gas frequently contains sufficient neon as an impurity to produce optical maser action. In addition to the direct interaction of neon with oxygen, a transfer of energy from helium to neon assists the excitation process. Other molecular gases, such as, for example, nitrogen, may be employed as the active gas. Furthermore, gases other than the noble gases may be used as the auxiliary gases. Such gases may be either atomic or molecular.

What is claimed is:
1. An optical maser comprising
 means forming an enclosed space,
 a gaseous mixture in said space,
 said mixture including a first gas and a second gas,
 said first gas having an energy system characterized by a metastable energy state above the ground state,
 said second gas having a polyatomic molecule characterized by at least one repulsive neutral excited molecular energy state, the metastable state of said first gas being substantially matched to the repulsive state of the molecule of said second gas, the molecule of said second gas including at least one atom having a plurality of energy states above the ground state, said repulsive molecular energy state terminating in an upper energy state of said atom, means for exciting said first gas to its metastable state for transferring energy by resonant collision processes to said repulsive molecular state of said second gas and by dissociative transfer to said upper energy state of said atom whereby a population inversion is produced between two optically connected energy states thereof, and means defining a light beam path through the gaseous mixture in said enclosed space.

2. An optical maser as claimed in claim 1 wherein said first gas is a noble gas.

3. An optical maser as claimed in claim 1 wherein said second gas is oxygen.

4. An optical maser as claimed in claim 3 wherein said first gas is argon.

5. An optical maser as claimed in claim 3 wherein said first gas is neon.

6. An optical maser as claimed in claim 1 wherein said repulsive molecular energy state terminates in the upper of an optically connected pair of energy states of said atom.

7. An optical maser as claimed in claim 1 wherein said exciting means comprises means for producing free electrons in said enclosed space.

8. An optical maser as claimed in claim 7 wherein said metastable state of said atom lies below the upper state of said optically connected pair of states.

9. An optical maser as claimed in claim 8 wherein said metastable state of said atom has a relatively large cross-section for electron collision excitation to the upper state of said optically connected pair of states.

10. An optical maser comprising
means forming an enclosed space,
a gaseous mixture in said space,
said mixture including a first gas and a second gas,
said first gas having an energy system characterized by a metastable state above the ground state,
said second gas having a polyatomic molecule characterized by at least one repulsive neutral excited molecular energy state,
the metastable state of said first gas being substantially matched to the repulsive state of the molecule of said second gas,
the molecule of said second gas including at least one atom having a pair of optically connected energy states and a metastable state,
said repulsive molecular energy state terminating in said metastable state of said atom,
means for exciting said first gas to its metastable state for transferring energy by inelastic collision processes to said repulsive molecular state of said second gas and by dissociative transfer to said metastable state of said atom,
means for exciting metastable atoms of said second gas to the upper state of said optically connected pair of energy states to produce a population inversion between said pair,
and means defining a light beam path through the gaseous mixture in said enclosed space.

11. An optical maser as claimed in claim 10 wherein said first gas is a noble gas.

12. An optical maser as claimed in claim 10 wherein said second gas is oxygen.

13. An optical maser as claimed in claim 12 wherein said first gas is argon.

14. An optical maser as claimed in claim 12 wherein said first gas is krypton.

No references cited.